United States Patent [19]
Honda et al.

[11] Patent Number: 5,296,884
[45] Date of Patent: Mar. 22, 1994

[54] CAMERA HAVING A DATA RECORDING FUNCTION

[75] Inventors: Tsutomu Honda; Yasuhiro Morimoto; Kuniteru Sakakibara; Kenji Nakamura, all of Takatsuki; Hirokazu Naruto, Higashiosaka; Hiroshi Ishibe, Kyoto, all of Japan

[73] Assignee: Minolta Camera Kabushiki Kaisha, Osaka, Japan

[21] Appl. No.: 905,503

[22] Filed: Jun. 25, 1992

Related U.S. Application Data

[63] Continuation of Ser. No. 660,353, Feb. 22, 1991, abandoned.

[30] Foreign Application Priority Data

Feb. 23, 1990 [JP] Japan .................. 2-043347

[51] Int. Cl.⁵ .................................. G03B 17/24
[52] U.S. Cl. ....................................... 354/106
[58] Field of Search ......................... 354/105, 106; 356/110–113, 906, 909

[56] References Cited

U.S. PATENT DOCUMENTS 4,122,521 10/1978 Rick et al. .................. 364/424
4,800,577 1/1989 Tachita et al. .............. 375/115
4,837,628 6/1989 Sasaki ........................ 358/209
5,045,937 9/1991 Myrick ..................... 358/110 X

FOREIGN PATENT DOCUMENTS 2-149834 6/1990 Japan .
9004302 4/1990 PCT Int'l Appl. .

OTHER PUBLICATIONS

The Operating Instructions of CANON Technical Back E p. 3, 41–43, 46 and 48 with translation thereof, 1987.

Primary Examiner—David M. Gray
Attorney, Agent, or Firm—Price, Gess & Ubell

[57] ABSTRACT

A camera is disclosed which has means for receiving an electric wave which is transmitted from an external device in a wireless manner (e.g., equipment for radio navigation systems, satellites and radio stations). When an image of an object is recorded at every shot on a recording medium loaded in said camera, a data corresponding to every shot is recorded in accordance with the electric wave received by said receiving means. Preferably said camera further has means for detecting a place where the photo-taking operation is carried out and in accordance with the detection of said detecting means, the data corresponding to every shot is recorded. Thus, records of the object image together with data relating to place can be obtained without any manual operation prior to every photo-taking operation.

11 Claims, 7 Drawing Sheets

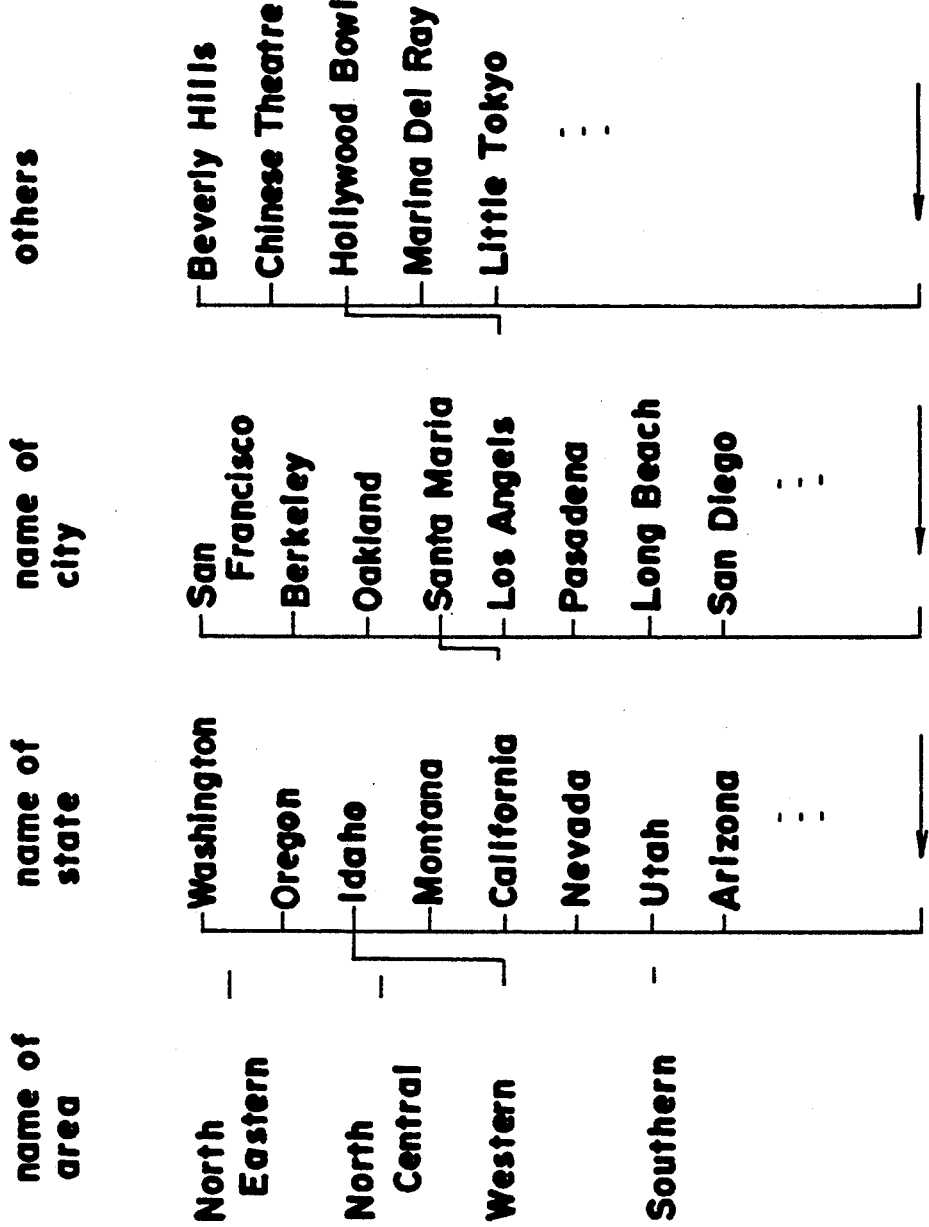

CAMERA HAVING A DATA RECORDING FUNCTION

This is a continuation of application Ser. No. 660,353, filed on Feb. 22, 1991, for a CAMERA HAVING A DATA RECORDING FUNCTION, now abandoned.

BACKGROUND OF THE INVENTION

1. Field of the Invention

This invention relates to a camera, more particularly to a camera which can record data other than image of object at the time of phototaking.

2. Description of the Related Art

Among conventional cameras capable of recording data other than image of object at the time of photo-taking, various cameras have been proposed in which date data and the number of frames are automatically set, and such data are imprinted onto the film.

In addition, a camera has been known, which can imprint data of exposure control mode onto the film by attaching a device to the camera body, such as in Canon's Technical Back E. Further, as to Canon's Technical Back E, an extra keyboard unit can be connected thereto, and by operating the keys of the keyboard unit, the operator can set any arbitrary combination of letters and numbers desired to be imprinted onto the film.

However, in these conventional cameras, if the operator tried to record data regarding the location of photo-taking, he/she had to go to the trouble of manually setting each letter to be recorded in the camera one by one prior to every photo-taking operation.

SUMMARY OF THE INVENTION

It is an object of this invention to provide a camera capable of recording data other than image of object at the time of photo-taking, which can automatically record data relating to the place where photo-taking operation is carried out.

It is also an object of this invention to provide a camera which can record data relating to place together with image of object without having the operator do any special manual operation for that purpose.

It is still another object of this invention to provide a camera which can record data relating to place together with image of object without installing a special manually operable member.

It is yet another object of this invention to provide a camera capable of recording data other than image of object at the time of photo-taking, which can record the data in accordance with wireless electric waves transmitted from an external device.

It is another object of this invention to provide a camera system capable of searching for picture images recorded by the camera, which can conduct such search by data relating to place.

It is further another object of this invention to provide a camera system capable of searching for picture images recorded by the camera, which can easily record data, as search data corresponding to every picture image, which is easy for the operator to remember.

In order to attain the above-described object, a camera according to the present invention includes: first means for recording an image of an object on a recording medium at every photographic shot, means for receiving an electric wave transmitted from an external device in a wireless manner and second means for recording data corresponding to every photographic shot in accordance with the electric wave received by said receiving means.

Since the camera system according to the present invention includes the above-described elements, the camera records data in accordance with wireless electric waves from outside equipment, and therefore, it is not necessary for the operator to manually set data corresponding to every shot, to be recorded. Furthermore, it is not necessary to provide a manually operable unit for that purpose on the camera.

In order to attain the above-described object, a camera according to the present invention includes: first means for recording an image of an object on a recording medium at every shot, means for automatically detecting a place where the shot is carried out and second means for recording data relating to the place detected by said detecting means with respect to every shot.

Since the camera system according to the present invention includes the above-described elements, the camera automatically detects the place where a phototaking operation is carried out and records the data in accordance with the detection. The operator, therefore, can record data relating to place together with the image of object without any special manual operation for that purpose.

According to a further aspect of the present invention, a camera system according to the present invention includes: first means for recording an image of an object on a recording medium at every shot, means for receiving an electric wave transmitted from an external device in a wireless manner, second means for recording data corresponding to every shot in accordance with the electric wave received by said receiving means, means for designating data relating to a desired image and means for searching, among data recorded by said recording means, for data identical with the data designated by said designating means to detect the desired image.

Since the camera system according to the present invention includes the above-described elements, the camera records data corresponding to the picture image in accordance with wireless electric waves transmitted from outside equipment, and a search for the recorded picture images may be carried out using said data. The operator, therefore, does not need to manually set search data corresponding to each picture image prior to every photo-taking operation.

According to a still further aspect of the present invention, a camera system according to the present invention includes: first means for recording an image of an object on a recording medium at every recording event, e.g., shot, means for storing in advance a plurality of data relating to various places, respectively, means for selecting one of the plurality of data stored by said storing means, second means for recording the data selected by said selecting means with respect to every shot, means for designating a data relating to a desired image and means for searching, among data recorded by said second recording means, for a data identical with the data designated by said designating means to detect the desired image.

Since the camera system according to the present invention includes the above-described elements, the camera can easily record data relating to place as search data corresponding to every picture image. Further, place is often more vividly remembered by the operator than date and time, it is likely that searches will be easier than conventional searches using date data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows one example of data relating to place stored in the camera in Embodiment 1.

DETAILED DESCRIPTION OF THE PREFERRED EMBODIMENTS

Embodiments of the invention will be explained below with reference to drawings.

Embodiment 1

Figure 1:
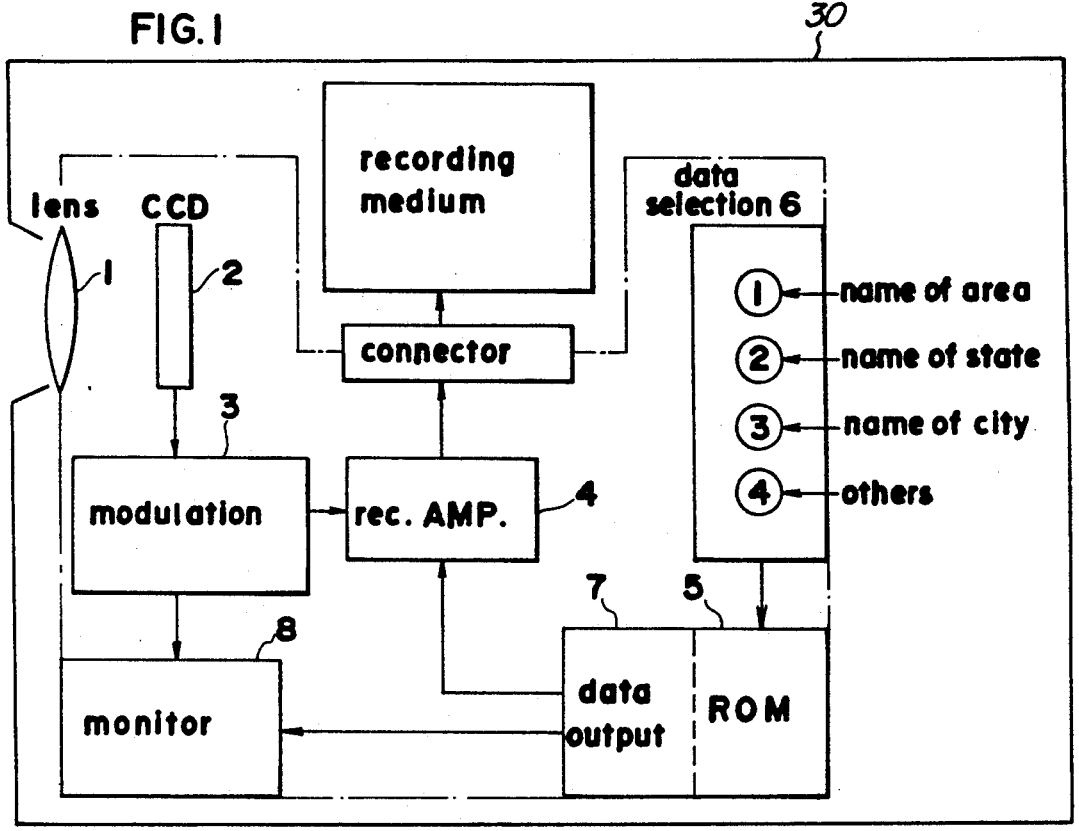
FIG. 1 is a block diagram of the inside structure of the still video camera in Embodiment 1.

Embodiment 1 will be explained referring to FIG. 1 and FIG. 2. FIG. 1 is a block diagram of the circuit structure inside a still video camera housing 30. The image of an object taken by means of lens 1 is converted to electrical image signals by an image sensing device 2, such as a CCD, which are then converted to recording signals by the modulation circuit 3. Then the image can be recorded on a recording medium in FIG. 1 such as an IC card, magnetic disk or optical disk through a record amplifier 4. Meanwhile the output from modulation circuit 3 is output to the monitor 8, which is equipped with a display element such as an LCD, enabling the operator to monitor the image while taking it.

On the other hand, as shown in FIG. 2, data relating to places is stored in categories such as area, state and city in the built-in ROM (read-only memory) chip 5. Each category contains a trigger to move to another category (the arrows in the figure). The switches 1 to 4 in data selection circuit 6 in FIG. 1 are the selection switches for each category. The operator can select any place data by using the switches.

Specifically, the operator selects one area among the available area names (Western, for example) by pressing switch 1 as many times as he chooses. He then selects one state among the available state names (California, for example) by pressing switch 2 and then one city among the city names (Los Angeles, for example) by pressing switch 3. He can also select one tourist spot among the available tourist spot names by pressing the switch 4. If the operator wants to go back to the first category above, he can do so by selecting the arrow.

The place data selected above are output to both monitor 8 and record amplifier 4 by data output unit 7 in the form of electric signals. Record amplifier 4 inputs date and time data from a known circuit not indicated in the figure, adds the place data and date/time data onto the recording signals, and records them according to the operation of a shutter release button, which is also not shown in the figure. The monitor 8 displays the selected place data on a display element provided beside display element for the picture.

The place data to be recorded on the recording medium through record amplifier 4 can be imposed on the pictures as letter-image signals; however, in this embodiment, they are recorded as codes apart from the pictures.

In addition to place-names, it is also possible to store various other data relating to place, such as origins of city names and special products of the region, in ROM chip 5.

Figure 1A:
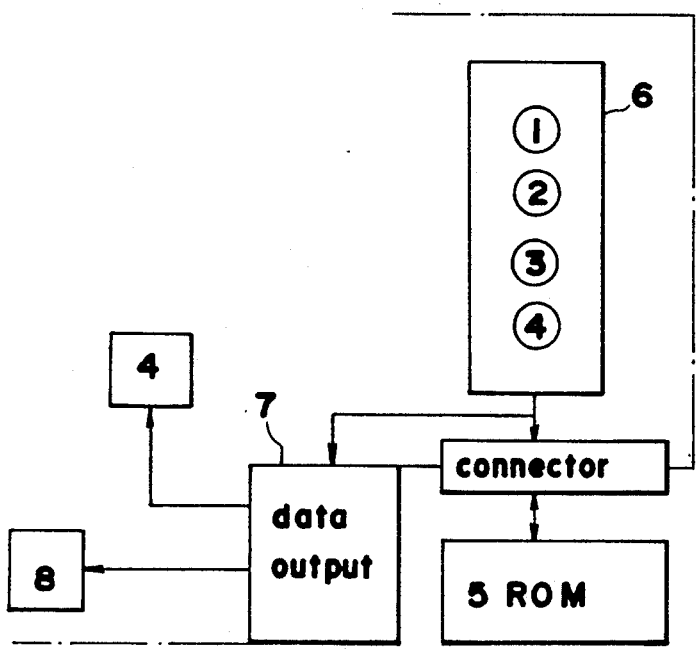
FIG. 1A shows a variant of the inside structure in Embodiment 1.

Further, as in FIG. 1A, it is also possible to provide ROM chip 5 in the form of an easily exchangeable CD-ROM or IC card so that a ROM chip containing specific data can be used for each different location.

Embodiment 2

Figure 3:
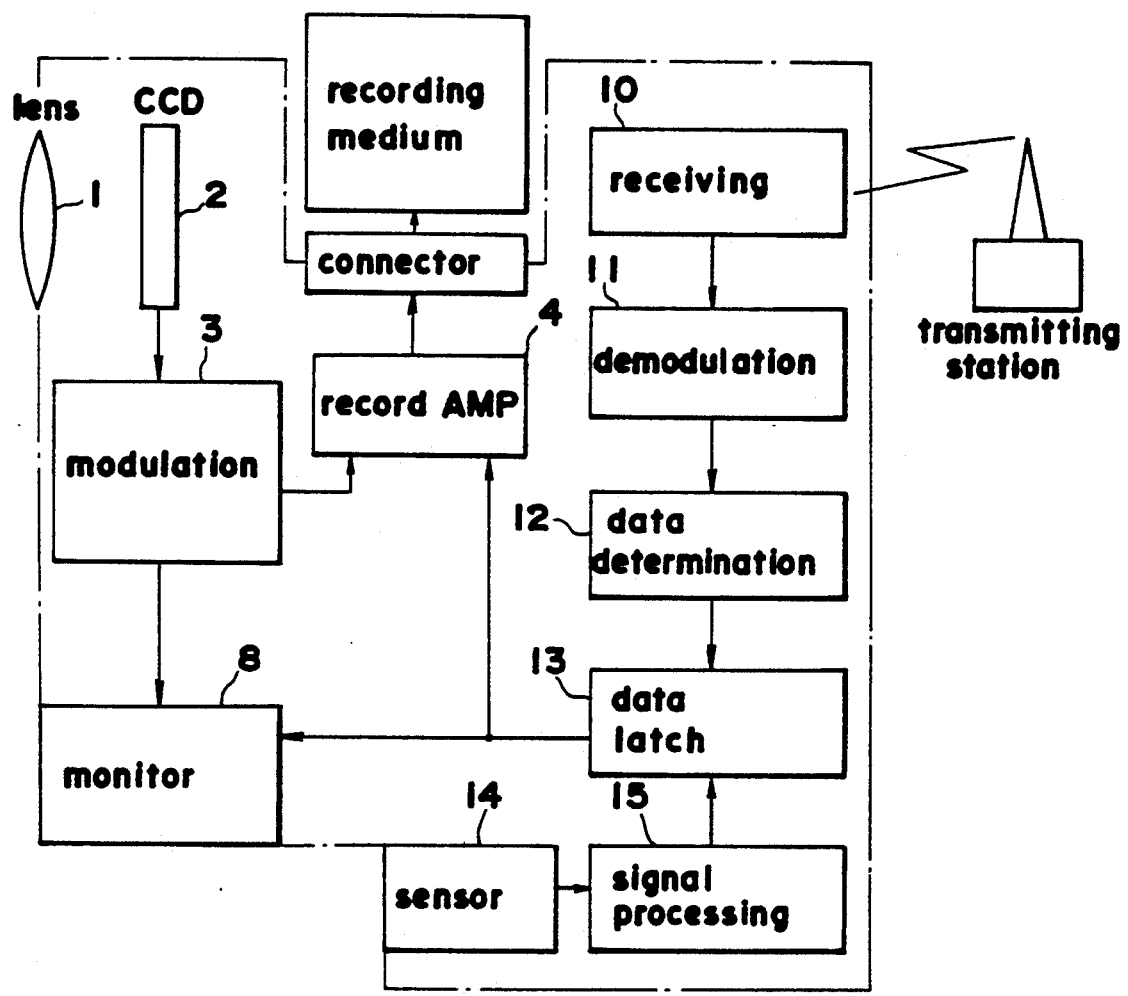
FIG. 3 is a block diagram of the inside structure of the still video camera of Embodiment 2.

Embodiment 2, which is a still video camera, will be explained referring to FIG. 3. Elements which function in the same manner as those in FIG. 1 or FIG. 2 have the same numbers as those in said figures.

The picture taken by lens 1 is converted to electronic signals by an image sensing device 2 and can be recorded on a recording medium via a modulation circuit 3 and record amplifier 4 in accordance with the operation of a shutter release button. This still video camera contains a built-in receiving circuit 10 which can receive electric wave from transmitting stations (satellites) using such methods as loran, Decca, Omega or GPS, Demodulation unit 11 demodulates the electric wave which is received when the still video camera starts its operation. The present location is determined by means of data determination unit 12 based on the demodulated signals in accordance with the respective method.

Figure 4:
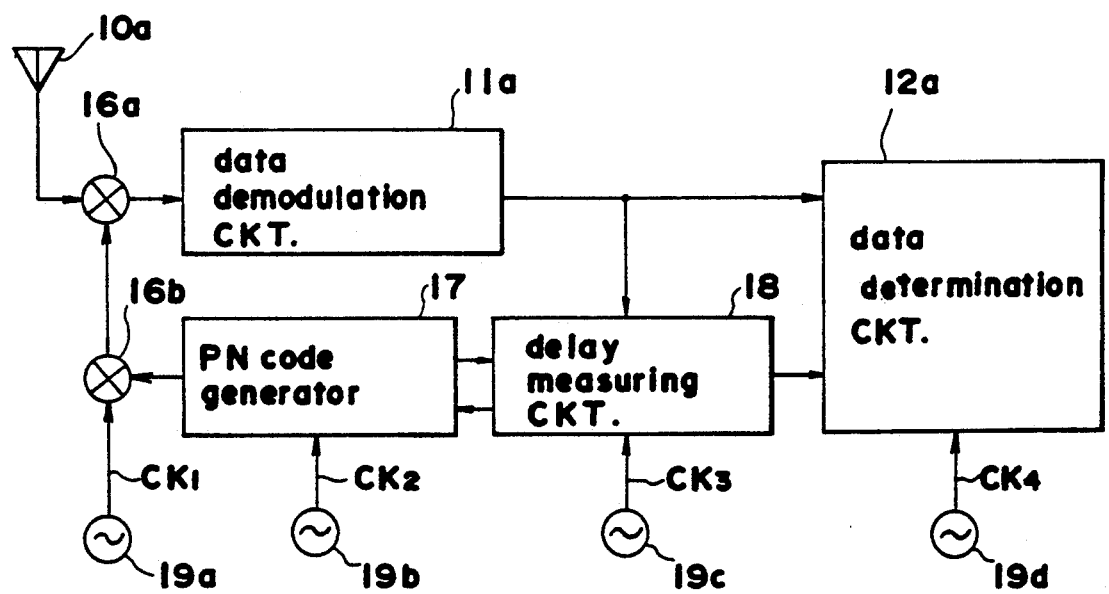
FIG. 4 is a detailed block diagram of 10, 11 and 12 of FIG. 3.

FIG. 4 is a detailed block diagram of receiving circuit 10, demodulation unit 11, determination unit 12 and their peripherals when, for example, current location is determined from the electric waves from a transmitting satellite.

Antenna 10a is, for example, of the quadrifilar helix type, which receives transmitted electric waves from a Navastar satellite not drawn in the figure. The RF signals received by this antenna 10a are transmitted to mixer 16a. On the other hand, modulator 16b defuses the local oscillation signals $CK_1$ from local oscillator 19a by the PN code signals from PN code generator 17, and the diffused modulation signals are input to said mixer 16a. In this way, said RF signals are converted into IF signals, as an intermediate frequency, and input to data demodulation circuit 11a. The data demodulation circuit 11a demodulates from the input signals a data concerning time of data transmission from the satellite. The demodulated data is input to data determination circuit 12a and delay measuring circuit 18.

When demodulated data is input to delay measuring circuit 18, said delay measuring means first transmits timing signals to PN code generator 17. PN code generator 17 is generating PN codes at all times by clock pulse $CK_2$ from PN code clock generator 19b, and is so designed to transmit the generated PN codes to delay measuring circuit 18 when it receives said timing signals. Then the PN code from data demodulation circuit 11a and the PN code from PN code generator 17 are transmitted to delay measuring circuit 18, and the delay time necessary for obtaining the correlation of the two PN codes is measured. The delay time between the two PN codes is measured by counting the high frequency clock pulse $CK_3$ from measuring clock generator 19c. The count is transmitted to data determination circuit 12a from delay measuring circuit 18 as delay data needed for the correlation of the two PN codes.

The data determination circuit 12a is composed of microprocessors and is driven by clock pulse $CK_4$ from data processing clock generation circuit 19d. It calculates the time taken for the transmission of the electric waves from the satellite to the GPS receiver (or the camera) in accordance with the transmission time data included in the demodulated data from data demodulation circuit 11a and the receiving time data obtained from a cesium or rubidium-vapor atomic clock, not shown in the figure, and in response to the calculated time it calculates the distance from the satellite to the GPS receiver (or the camera). Then the data determination circuit 12a calculates information regarding latitude, longitude and altitude of the camera (or the operator) on the basis of the information regarding distance from the respective satellite and information regarding the location of the satellite included in the demodulated data.

The determination is made by first calculating the absolute location in terms of longitude, latitude and altitude as explained above, and then selecting a place data corresponding to the absolute location through checking the place names and their respective area data stored in the determination unit 12, as in the case of Embodiment 1. Place data obtained by the data determination unit 12 is output to data latch 13. In addition, data determination unit 12 contains a switch, not indicated in the figure, and unless this switch is operated, the place data in data latch 13 cannot be rewritten. Therefore, the same place data may be continuously selected when the operator does not want to change the place data to be recorded or when the conditions for transmission of electric wave have deteriorated.

Though the above data determination unit 12 transmits a specific place name, it is possible to simply transmit the longitude and latitude.

Furthermore, the still video camera contains a built-in sensor 14 which can detect the temperature and humidity at the time of picture-taking. The detected results are transmitted to data latch 13 after being matched with the place data in data type by signal processing unit 15. While place data and temperature/humidity data are always output to monitor 8 from data latch 13, the data are output to the record amplifier 4 only when the shutter release button, not indicated in the figure, is operated. These data are added to the image data by the record amplifier 4 and recorded in a recording medium.

In this embodiment, receiving unit 10, demodulation unit 11, data determination unit 12 and data latch 13, employed in producing place data, are provided in the camera in built-in form; it is also possible to provide them as modular components detachable from the camera body.

Figure 5:
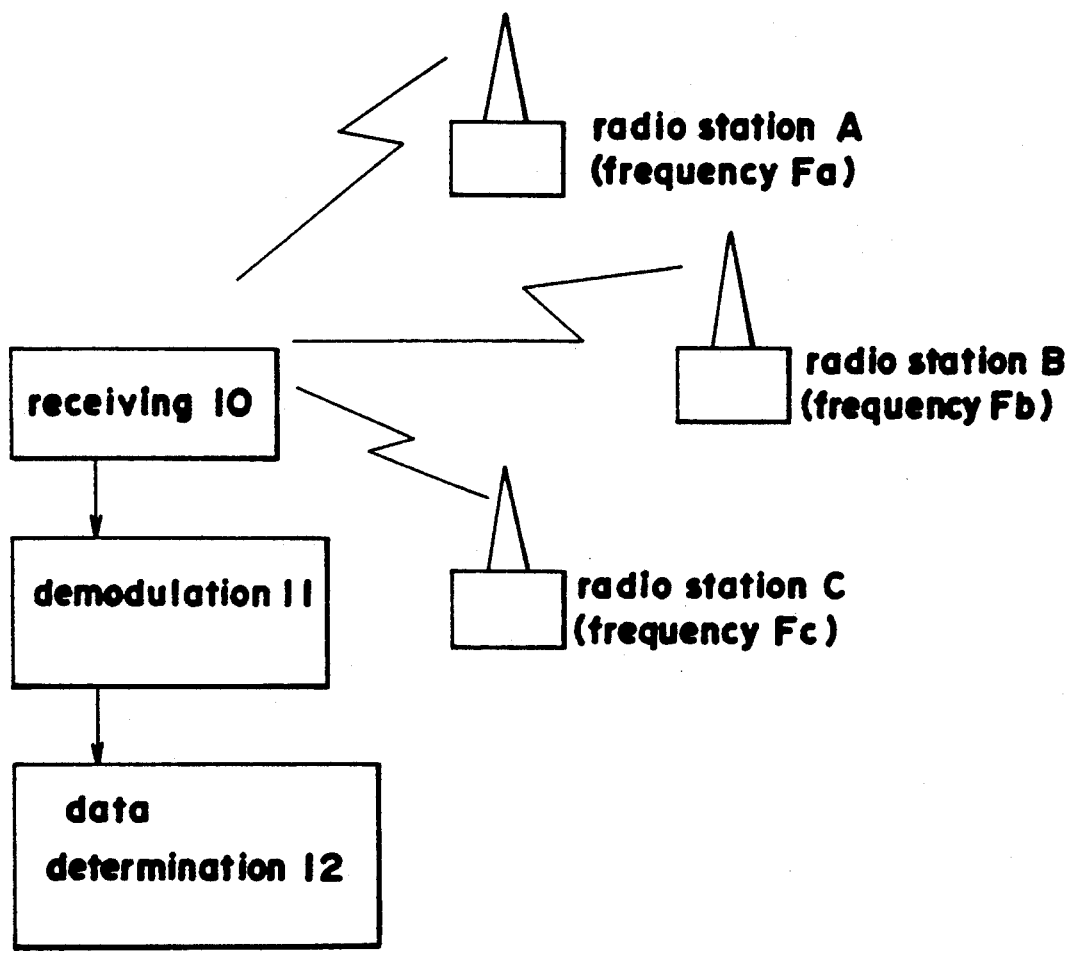
FIG. 5 shows a segmental block diagram of modified Embodiment 2.

Further, since it is usually not necessary to precisely determine the location by the loran method, for example, it is also acceptable to determine location by receiving electric waves from existing AM or FM radio stations with receiving circuit 10, demodulating them with demodulation unit 11 and detecting the frequency and field intensity of the electric wave with data determination unit 12 (referring to FIG. 5). It would be useful as well, too, to install a local transmitting station, which transmits codes relating to place directly, in tourist areas or tourist facilities (e.g., major JR or private railway stations, service area, parking area or interchange of expressways, bays, ships, etc.) for the camera to receive the code from these stations and determine the location through decoding said code.

Embodiment 3

Figure 6:
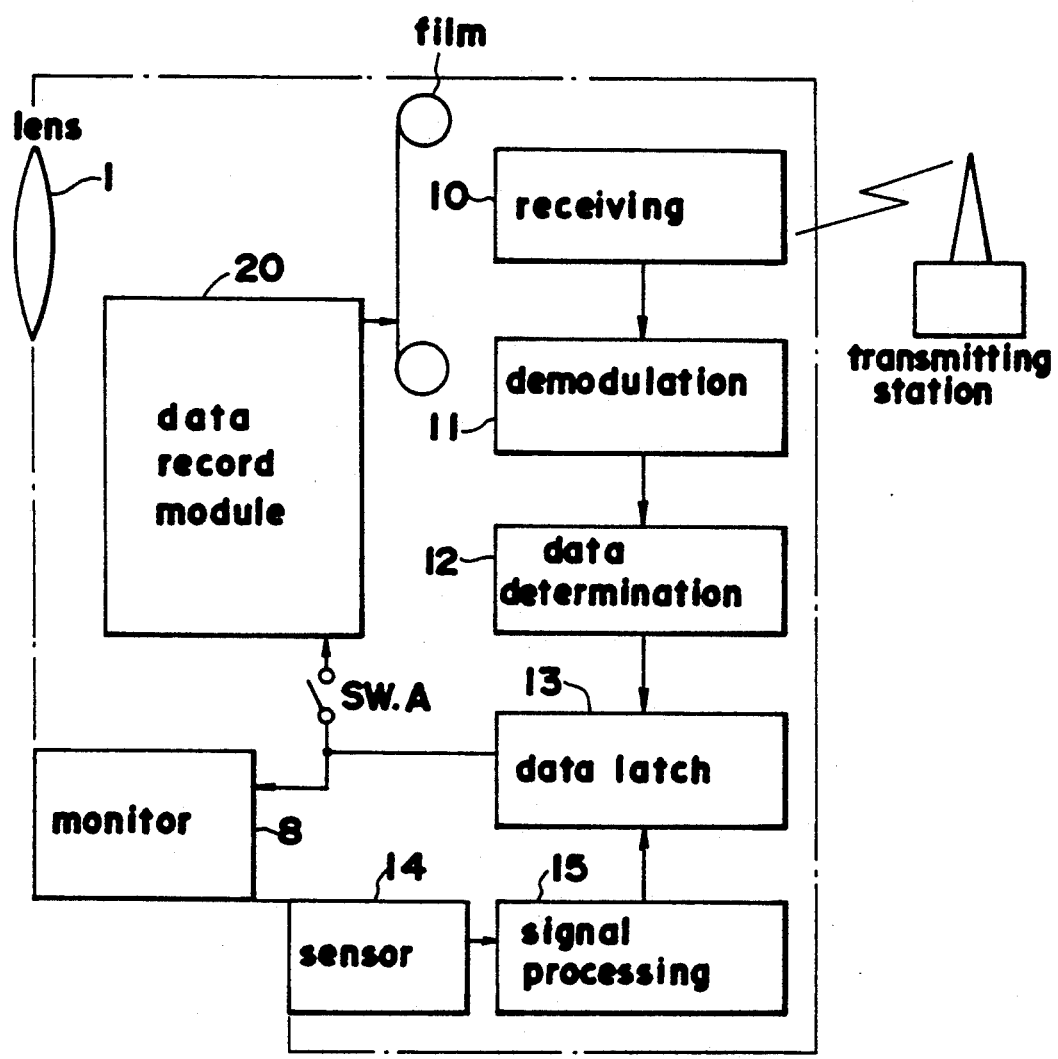
FIG. 6 is a block diagram of the inside structure of the SLR camera of Embodiment 3.

Embodiment 3, which is an SLR camera, will be explained with reference to FIG. 6. Elements having the same functions as those in FIG. 1, FIG. 2 or FIG. 3 have the same numbers as in said drawings.

The image of object obtained through lens 1 is recorded on a film in accordance with the operation of a shutter release button, not indicated in the diagram. When the switch A is ON, place data and temperature/humidity data from data latch 13 are recorded on the film simultaneously by data record module 20.

The position of the recording of the data can be either inside or outside a frame of the film. It is also possible to record a portion of the data inside the frame and the rest outside the frame.

Searching

Figure 7:
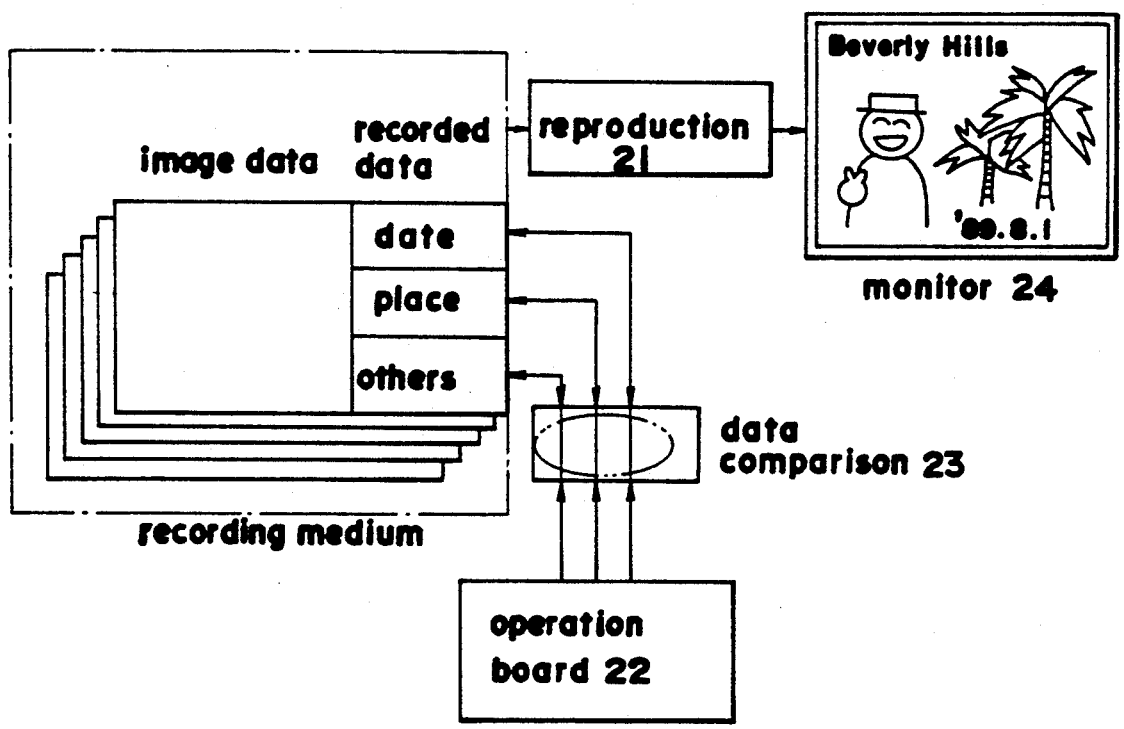
FIG. 7 is a block diagram of one example of a structure for search by recorded data.

Searching of image of object recorded by the above-described cameras will be explained referring to FIG. 7.

When a recording medium which has already recorded is set in the filing device, in accordance to selection of recorded place data or date/time data, the image can be selectively reproduced by the signal reproduction unit 21 of the filing device, which has a built-in magnetic reproducer or photoelectric converter. The recorded data corresponding to the place and date/time inputted by operation board 21 is searched in response to the output of data comparison unit 23, and when the recorded data corresponding to the inputted data is found, they are sent to an outer monitor 24, such as a television receiver, together with their corresponding recorded image. The data and image are then displayed on an outer monitor 24.

If, when searching by place name, the filing device is set to search all place data in lower categories (e.g., Disneyland, Rose Parade) of the place data inputted by the operation board 22 (e.g., California), it will be more convenient to search records regarding travel.

As explained above, if data relating to place can be recorded, searching of records will be easier than conventional data-based searching, because people generally remember places easier than dates. Further, more search methods are available because the search can be done by such other data relating to the place as weather and event, in addition to the place name itself.

What is claimed is:

1. A camera system comprising:
   a camera housing capable of being hand-held by an operator, including within the housing:
   first means for recording an image of an object on a recording medium at every recording event;
   means for receiving an electric wave transmitted from an external device in a wireless manner including a antenna operatively mounted on the camera housing;
   means for storing a plurality of predetermined data in advance;
   means for selecting a portion of the data stored by said storing means in accordance with the electric wave received by said receiving means to output data relating to the names of physical places;
   first monitor means on the camera housing to display the names of physical places to the operator;

second means for recording the data output by said selecting means with respect to every recording event; and a filing device including:

means for designating specific data relating to a desired image that has been recorded; and means for searching, among the data recorded by said second recording means, for data identical with the data designated by said designating means to detect the desired image, and means for reproducing the image recorded on the recording medium wherein said reproducing means reproduces the image searched by said searching means, including a second monitor for displaying both the image and output data relating to the names of physical places.

2. A camera according to claim 1 wherein said storing means stores a plurality of data relating to the names of physical places, respectively, and said selecting means selects the data relating to a place where the recording event is carried out.

3. A camera system according to claim 1 wherein said designating means includes means for inputting reference data and said searching means includes means for comparing the inputted reference data with the data recorded by said second recording means, said searching means detects the image in response to said comparing means.

4. A camera according to claim 1 wherein said storing means includes a plurality of recording media to be interchangeably loaded in said camera, each of the plurality of recording media storing various data, respectively.

5. A camera system comprising:

a camera housing capable of being hand-held by an operator, including within the housing:

first means for recording an image of an object on a recording medium at every recording event;

means for storing in advance a plurality of predetermined data relating to the names of physical places, respectively;

means manually operable for selecting one of the physical places from the plurality of data stored by said storing means;

first monitor means on the camera housing to display the names of physical places to the operator from the stored data;

second means for recording the corresponding data selected by said selecting means with respect to every recording event;

a filing device including:

means for designating specific data relating to a desired image that has been recorded;

means for searching, among the data recorded by said second record means, for data identical with the data designated by said designating means to detect the desired image, and means for reproducing the image recorded on the recording medium wherein said reproducing means reproduces the image searched by said searching means, including a second monitor for displaying both the image and corresponding names of physical places.

6. A camera according to claim 5 wherein said storing means includes a plurality of recording media to be interchangeably loaded in said camera, each of the plurality of recording media storing various data, respectively.

7. A camera system according to claim 5, wherein the means for storing includes a plurality of exchangeable memory devices that contain stored predetermined data related to a geographical area, and an individual memory device is capable of being inserted into the camera system for a particular location in which the operator wishes to record events.

8. A camera system according to claim 7, wherein the selecting means includes a plurality of switches corresponding, respectively, to categories of physical places.

9. A camera system comprising:

a camera housing capable of being hand-held by an operator, including within the housing:

first means for recording an image of an object on a recording medium at every recording event;

means for receiving an electrical wave transmitted from an external device in a wireless manner;

means for storing a plurality of predetermined data in advance;

means for selecting a portion of the data stored by said storing means in accordance with the electrical wave received by said receiving means to output data relating to the name of events;

second means for recording the data output by said selecting means with respect to every recording event; and a filing device including:

means for designating specific data relating to a desired image that has been recorded; and means for searching, among the data recorded by said second recording means, for data identical with the data designated by said designating means to detect the desired image.

10. A camera capable of being hand-held for recording images, comprising:

a camera housing including therein the following:

first means for recording an image of an object on a recording medium at every recording event;

means for receiving an electrical wave transmitted from an external device in a wireless manner;

means for interchangeably storing a plurality of predetermined data in advance, including a memory for storing categories of data related to a geographical area or physical place;

means for selecting one of the data stored by said memory in accordance with the electrical wave received by said receiving means;

display means on the camera housing for displaying to the operator a common name of one of the geographical areas or physical places prior to recording the image;

second means for recording the data selected by said selecting means with respect to every recording event;

means for designating data relating to a desired image; and means for searching, among the data recorded by said second recording means, for data identical with the data designated by said designating means to detect the desired image.

11. A camera system comprising:

a transmitter provided separately from a camera, including means for transmitting an electrical wave carrying codes directly relating to a name of a physical place or event in a wireless manner; and a camera housing capable of being hand-held by one operator, including within the housing:

first means for recording an image of an object on a recording medium at every recording event;
monitor means for disclosing an image to an operator;
means for receiving the electrical wave transmitted from said transmitter, including an antenna operatively mounted on the camera housing;
means for decoding the codes in accordance with the electrical wave received by said receiving means to output data representing the name for the physical place or event;
means for displaying alphabetical names of the physical place or event broadcast by the transmitter on the monitor, from the output data, for viewing by on the operator prior to recording the image; and
second means for recording both the event and the data output by the decoding means.

* * * * *